(12) United States Patent
Kahlen et al.

(10) Patent No.: US 12,269,939 B2
(45) Date of Patent: Apr. 8, 2025

(54) FOAMED POLYPROPYLENE COMPOSITION COMPRISING POLYMERIC FIBERS

(71) Applicant: BOREALIS AG, Vienna (AT)

(72) Inventors: Susanne Kahlen, Linz (AT); Daniela Mileva, Linz (AT); Georg Grestenberger, Linz (AT); Michael Jerabek, Linz (AT); Thomas Lummerstorfer, Linz (AT)

(73) Assignee: BOREALIS AG, Vienna (AT)

( * ) Notice: Subject to any disclaimer, the term of this patent is extended or adjusted under 35 U.S.C. 154(b) by 689 days.

(21) Appl. No.: 15/734,895

(22) PCT Filed: Jul. 30, 2019

(86) PCT No.: PCT/EP2019/070482
§ 371 (c)(1),
(2) Date: Dec. 3, 2020

(87) PCT Pub. No.: WO2020/025605
PCT Pub. Date: Feb. 6, 2020

(65) Prior Publication Data
US 2021/0221990 A1 Jul. 22, 2021

(30) Foreign Application Priority Data
Jul. 31, 2018 (EP) .................................... 18186625

(51) Int. Cl.
*C08L 23/12* (2006.01)
*C08L 23/16* (2006.01)

(52) U.S. Cl.
CPC .............. *C08L 23/12* (2013.01); *C08L 23/16* (2013.01); *C08L 2203/14* (2013.01); *C08L 2205/02* (2013.01); *C08L 2205/16* (2013.01); *C08L 2205/22* (2013.01); *C08L 2205/24* (2013.01); *C08L 2207/02* (2013.01)

(58) Field of Classification Search
CPC ... C08L 23/12; C08L 2203/14; C08L 2207/02
See application file for complete search history.

(56) References Cited

U.S. PATENT DOCUMENTS

| | | | |
|---|---|---|---|
| 5,145,892 A | 9/1992 | Yasukawa et al. | |
| 2006/0264543 A1* | 11/2006 | Lustiger | C08K 3/01 |
| | | | 524/502 |
| 2007/0224901 A1* | 9/2007 | Kim | B24D 18/0009 |
| | | | 442/247 |
| 2011/0263738 A1 | 10/2011 | Yamamoto et al. | |
| 2015/0252179 A1 | 9/2015 | Kwon et al. | |
| 2015/0368449 A1 | 12/2015 | Kastner et al. | |
| 2017/0120170 A1* | 5/2017 | Desmottes | B01D 24/12 |
| 2018/0201763 A1 | 7/2018 | Jerabek et al. | |

FOREIGN PATENT DOCUMENTS

| | | | |
|---|---|---|---|
| CN | 104204070 A | 9/2014 | |
| CN | 104893092 A | 9/2015 | |
| EP | 397881 A * | 11/1990 | ............... C08J 5/04 |
| EP | 0491566 A2 | 6/1992 | |
| EP | 591224 A1 | 4/1994 | |
| EP | 0887379 A1 | 12/1998 | |
| EP | 2610270 A1 | 3/2013 | |
| EP | 2610271 A1 | 7/2013 | |
| EP | 2610272 A1 | 7/2013 | |
| EP | 3088459 A1 | 11/2016 | |
| EP | 3184586 A1 | 6/2017 | |
| EP | 3263641 A1 | 1/2018 | |
| EP | 3330315 A1 | 6/2018 | |
| RU | 2557247 C2 | 7/2015 | |
| WO | 8707620 A1 | 12/1987 | |
| WO | 9212182 A1 | 7/1992 | |
| WO | 9219653 A1 | 11/1992 | |
| WO | 9219658 A1 | 11/1992 | |
| WO | 9924478 A1 | 5/1999 | |
| WO | 9924479 A1 | 5/1999 | |
| WO | 0068315 A1 | 11/2000 | |
| WO | 2004000899 A1 | 12/2003 | |
| WO | 2004111095 A1 | 12/2004 | |
| WO | 2009095426 A2 | 8/2009 | |
| WO | 2012007430 A1 | 1/2012 | |
| WO | 2013149915 A1 | 10/2013 | |
| WO | 2014023603 A1 | 2/2014 | |

(Continued)

OTHER PUBLICATIONS

Office Action English Translation for Russian Patent Application No. 2021100655/04, dated Jul. 23, 2021, 14 pages.
Search Report with English Translation for Russian Patent Application No. 2021100655/04, dated Jul. 21, 2021, 4 pagtes.
International Search Report and Written Opinion for PCT/EP2019/070482 mailed Aug. 30, 2019, 11 pages.
Brandrup et al., "Polymer Handbook", 4th edition, Chapter 3, John Wiley & Sons, Inc., 2000, 61 pages.
Busico, et al., "Alk-1-ene Polymerization in the Presence of a Monocyclopentadienyl Zirconium (iv) Acetamidinate Catalyst: Microstructural and Mechanistic Insights a," Macromolecular Rapid Commun., vol. 28, 2007, pp. 1128-1134.
Cheng, H.N., "C NMR Analysis of Ethylene-Propylene Rubbers," Macromolecules, 1984, vol. 17, 1984, pp. 1950-1955.

(Continued)

*Primary Examiner* — Kregg T Brooks
*Assistant Examiner* — David R. Foss
(74) *Attorney, Agent, or Firm* — Lowenstein Sandler LLP

(57) ABSTRACT

The present invention is directed to a polypropylene composition (C) comprising a heterophasic propylene copolymer (HECO), comprising a matrix being a propylene polymer (PP1), an elastomeric propylene copolymer (EPR) being dispersed in said matrix and a nucleating agent (NU). The polypropylene composition (C) further comprises polymeric fibers (PE). The present invention is also directed to a foamed article comprising the polypropylene composition (C) and the use of polymeric fibers (PE) as an impact modifier for a heterophasic propylene copolymer (HECO).

10 Claims, No Drawings

(56) References Cited

FOREIGN PATENT DOCUMENTS

WO    WO-2016173976 A1 * 11/2016  .............. C08F 10/06
WO    WO-2017108746 A1 *  6/2017  .............. C08K 7/14

OTHER PUBLICATIONS

Zweifel, "Plastic Additives Handbook", Coloration of Styrenic and Acrylic Polymers, Hanser Publications, 2001 pp. 871-873.
Zhou, et al., "A new decoupling method for accurate quantification of polyethylene copolymer composition and triad sequence distribution with 13C NMR," Journal of Magnetic Resonance, vol. 187, 2007, pp. 225-233.
Wang, et al., "Structural Analysis of Ethylene/Propylene Copolymers Synthesized with a Constrained Geometry Catalyst," Macromolecules, 2000, vol. 33, pp. 1157-1162.
Singh, et al., "Triad Sequence Determination of Ethylene-Propylene Copolymers—Application of Quantitative 13C NMR," Polymer Testing, 2009, vol. 29, pp. 475-479.
European Search Report for 18186625.2 mailed Jan. 14, 2019, 10 pages.
International Preliminary report on Patentability for PCT/EP2019/070482 mailed Nov. 30, 2020, 15 pages.
Written Opinion of the International Preliminary Examining Authority for International Application No. PCT/EP2019/070482, mailed Jul. 7, 2020, 4 pages.
Zweifel, "Plastic Additives Handbook", 6th edition, 2009, pp. 1141-1190.
Office Action for European Application No. 18186625.2 dated Aug. 23, 2022, 4 pages.

* cited by examiner

FOAMED POLYPROPYLENE COMPOSITION COMPRISING POLYMERIC FIBERS

CROSS-REFERENCE TO RELATED APPLICATION(S)

This application is a national phase of International Application No. PCT/EP2019/070482, filed on Jul. 30, 2019, which claims the benefit of European Patent Application No. 18186625.2, filed on Jul. 31, 2018. The contents of these applications are hereby incorporated by reference in their entirety.

FIELD OF THE INVENTION

The present invention is directed to a polypropylene composition (C) comprising a heterophasic propylene copolymer (HECO), comprising a matrix being a propylene polymer (PP1) and an elastomeric propylene copolymer (EPR) being dispersed in said matrix. The polypropylene composition (C) further comprises polymeric fibers (PF). The present invention is also directed to a foamed article comprising the polypropylene composition (C) and the use of polymeric fibers (PF) as an impact modifier for a heterophasic propylene copolymer (HECO).

Recent demand for plastics in the automotive industry is towards weight reduction with preservation of the mechanical property profile and surface appearance. The European Union has approved tough $CO_2$ limits which mandates the car manufacturer to cut emission from current 160 to 120 g/km. Thus, weight saving materials are needed to fulfil said legislation. With the application of polypropylene materials containing inorganic fillers or glass fiber reinforced polypropylene compounds, the weight of automotive parts can be reduced. However, the density reduction which can be achieved according to this approach is limited.

Therefore, a possible next step to support further weight reduction is foaming during the injection-moulding conversion step which can be applied for non-visible and visible automotive parts.

When talking to automotive customers, the mechanical performance of the foamed parts shall be similar to the mechanical properties of the compact parts. However, the main challenges for foamed injection moulded parts are compressive properties which are related mainly to the foam in the core of the part and multiaxial impact properties which are determined by the combination of the skin layer of the foam and the core. In the case of core-back technology, however, flexural properties of the foamed part decrease naturally from the higher thickness versus the compact parts.

Accordingly, there is a need in the art for foamed parts made of polypropylene featured by improved flexural properties.

Therefore, it is an object of the present invention to provide a polypropylene composition which can be processed to obtain foamed parts having excellent mechanical properties.

Accordingly, it is an object of the present invention to provide a polypropylene composition (C), comprising
 a) 60.0 to 90.0 wt % of a heterophasic propylene copolymer (HECO) comprising
  i) a matrix being a propylene polymer (PP1), and
  ii) an elastomeric propylene copolymer (EPR) being dispersed in said matrix,
 b) optionally a 5.0 to 10.0 wt % propylene polymer (PP2) having a higher melt flow rate $MFR_2$ (230° C., 2.16 kg) determined according to ISO 1133 than the propylene polymer (PP1), and
 c) at least 10.0 to 40.0 wt % of polymeric fibers (PF), based on the overall weight of the polypropylene composition (C).

It was surprisingly found by the inventors that the strong decrease in the mechanical properties due to the collapse in foam structure can be overcome by adding polymeric fibers which better preserve the ductility of the material.

According to one embodiment of the present invention, the heterophasic propylene copolymer (HECO) has a melt flow rate $MFR_2$ (230° C., 2.16 kg) determined according to ISO 1133 in the range of 0.1 to 30 g/10 min.

According to another embodiment of the present invention, the propylene polymer (PP1) is a propylene homopolymer (H-PP1).

According to still another embodiment of the present invention, the heterophasic propylene copolymer (HECO) has a xylene soluble fraction (XCS) in the range of 25.0 to 40.0 wt %, based on the overall weight of the heterophasic propylene copolymer (HECO).

It is especially preferred that the xylene soluble fraction (XCS) of the heterophasic propylene copolymer (HECO) has
 i) a comonomer content in the range of 40.0 to 55.0 mol-%, and/or
 ii) an intrinsic viscosity IV determined according to DIN ISO 1628/1, October 1999 (in Decalin at 135° C.) in the range of 2.0 to 3.0 dl/g.

According to a further embodiment of the present invention, the polymeric fibers (PF) have
 i) an average fiber length in the range of 0.1 to 20.0 mm, and/or
 ii) an average fiber diameter in the range of 5.0 to 30.0 µm, and/or
 iii) a density in the range of 1100 to 1400 kg/m³.

According to another embodiment of the present invention, the polymeric fibers (PF) have
 i) a tenacity in the range of 3.0 to 17 cN/dtex, and/or
 ii) a Young Modulus determined according to ISO 5079 in the range of 3.0 to 35.0 N/tex.

It is especially preferred that the polymeric fibers (PF) are polyethylene terephthalate fibers (PET-F).

According to one embodiment of the present invention, the polypropylene composition (C) is free of glass fibers and carbon fibers.

According to another embodiment of the present invention, the polypropylene composition (C) is a foamable polypropylene composition.

The present invention is further directed to the use of polymeric fibers (PF) as an impact modifier for a heterophasic propylene copolymer (HECO) as described above.

Further, the present invention is directed to the use of the polypropylene composition (C) according to any one of claims 1, 3-6 and 8-10 for the production of a foamed article.

The present invention is further directed to a foamed article, preferably automotive article, comprising the polypropylene composition (C) according to any one of claims 1, 3-6 and 8-10.

Preferably, said foamed article comprises at least 90 wt % of the polypropylene composition (C).

In the following, the present invention is described in more detail.

The Polypropylene Composition (C)

The polypropylene composition (C) according to the present invention comprises heterophasic propylene copolymer (HECO) comprising a matrix being a propylene polymer (PP1) and an elastomeric propylene copolymer (EPR) being dispersed in said matrix as well as polymeric fibers (PF).

In particular, the polypropylene composition (C) comprises 60.0 to 90.0 wt %, more preferably 64.0 to 85.0 wt %, still more preferably 68.0 to 77.0 wt %, like 70.0 to 73.0 wt % of the heterophasic propylene copolymer (HECO) and 10.0 to 40.0 wt %, more preferably 12.0 to 35.0 wt %, still more preferably 15.0 to 25.0 wt %, like 18.0 to 21.0 wt % of the polymeric fibers (PF), based on the overall weight of the polypropylene composition (C).

Further, the polypropylene composition (C) may comprise a propylene polymer (PP2) having a higher melt flow rate $MFR_2$ (230° C., 2.16 kg) determined according to ISO 1133 than the propylene polymer (PP1).

Thus, according to a preferred embodiment of the present invention, the polypropylene composition (C) comprises 60.0 to 90.0 wt %, more preferably 64.0 to 85.0 wt %, still more preferably 68.0 to 77.0 wt %, like 70.0 to 73.0 wt % of the heterophasic propylene copolymer (HECO), 10.0 to 40.0 wt %, more preferably 12.0 to 35.0 wt %, still more preferably 15.0 to 25.0 wt %, like 18.0 to 21.0 wt % of the polymeric fibers (PF), and 5.0 to 10.0 wt %, more preferably 6.0 to 9.0 wt %, still more preferably 6.5 to 8.5 wt %, like 7.0 to 7.5 wt % of the propylene polymer (PP2), based on the overall weight of the polypropylene composition (C).

Additionally, the polypropylene composition (C) according to the present invention may comprise additives (AD).

Accordingly, it is preferred that the polypropylene composition (C) comprises, more preferably consists of, 60.0 to 90.0 wt %, more preferably 64.0 to 85.0 wt %, still more preferably 68.0 to 77.0 wt %, like 70.0 to 73.0 wt % of the heterophasic propylene copolymer (HECO), 10.0 to 40.0 wt %, more preferably 12.0 to 35.0 wt %, still more preferably 15.0 to 25.0 wt %, like 18.0 to 21.0 wt % of the polymeric fibers (PF) and 0.01 to 5.0 wt %, more preferably 0.1 to 4.0 wt %, still more preferably 0.5 to 3.0 wt %, like 1.0 to 2.5 wt % of additives (AD), based on the overall weight of the polypropylene composition (C).

Alternatively, it is preferred that the polypropylene composition (C) comprises, more preferably consists of, 60.0 to 90.0 wt %, more preferably 64.0 to 85.0 wt %, still more preferably 68.0 to 77.0 wt %, like 70.0 to 73.0 wt % of the heterophasic propylene copolymer (HECO), 10.0 to 40.0 wt %, more preferably 12.0 to 35.0 wt %, still more preferably 15.0 to 25.0 wt %, like 18.0 to 21.0 wt % of the polymeric fibers (PF), 5.0 to 10.0 wt %, more preferably 6.0 to 9.0 wt %, still more preferably 6.5 to 8.5 wt %, like 7.0 to 7.5 wt % of the propylene polymer (PP2) and 0.01 to 5.0 wt %, more preferably 0.1 to 4.0 wt %, still more preferably 0.5 to 3.0 wt %, like 1.0 to 2.5 wt % of additives (AD), based on the overall weight of the polypropylene composition (C).

The additives (AD) are described in more detail below.

Preferably the polypropylene composition (C) of the invention does not comprise (a) further polymer(s) different to the heterophasic propylene copolymer (HECO), the propylene polymer (PP1) and the elastomeric propylene copolymer (EPR), the polymeric fibers (PF), and the propylene polymer (PP2) in an amount exceeding 15.0 wt %, preferably in an amount exceeding 10.0 wt %, more preferably in an amount exceeding 9.0 wt %, based on the overall weight of the polypropylene composition (C).

Further, it is preferred that the polypropylene composition (C) is free of any fibers other than polymeric fibers (PF).

More preferably, the polypropylene composition (C) does not comprise fibers other than polymeric fibers (PF) in an amount exceeding 5.0 wt %, preferably in an amount exceeding 2.0 wt %, still more preferably in an amount exceeding 1.0 wt %, based on the overall weight of the polypropylene composition (C). The polymeric fibers (PF) are described in more detail below.

In particular, it is preferred that the polypropylene composition (C) is free of glass fibers. Additionally, it is preferred that the polypropylene composition (C) is free of carbon fibers. It is especially preferred that the polypropylene composition (C) is free of glass fibers and carbon fibers. More preferably, the polypropylene composition (C) does not comprise glass fibers and carbon fibers in an overall amount exceeding 5.0 wt %, preferably in an overall amount exceeding 2.0 wt %, still more preferably in an overall amount exceeding 1.0 wt %, based on the overall weight of the polypropylene composition (C).

According to a particularly preferred embodiment of the present invention, the polypropylene composition (C) consists of a) 60.0 to 90.0 wt %, more preferably 64.0 to 85.0 wt %, still more preferably 68.0 to 77.0 wt %, like 70.0 to 73.0 wt % of the heterophasic propylene copolymer (HECO) consisting of
  i) a matrix being a propylene polymer (PP1), and
  ii) an elastomeric propylene copolymer (EPR) being dispersed in said matrix,
b) optionally 5.0 to 10.0 wt %, more preferably 6.0 to 9.0 wt %, still more preferably 6.5 to 8.5 wt %, like 7.0 to 7.5 wt % of the propylene polymer (PP2) having a higher melt flow rate $MFR_2$ (230° C., 2.16 kg) determined according to ISO 1133 than the propylene polymer (PP1),
c) at least 10.0 to 40.0 wt %, more preferably 12.0 to 35.0 wt %, still more preferably 15.0 to 25.0 wt %, like 18.0 to 21.0 wt % of the polymeric fibers (PF), and
e) 0.01 to 5.0 wt %, more preferably 0.1 to 4.0 wt %, still more preferably 0.5 to 3.0 wt %, like 1.0 to 2.5 wt % of additives (AD),
based on the overall weight of the polypropylene composition (C).

Further, it is preferred that the polypropylene composition (C) is featured by a rather high flexural modulus. Accordingly, it is preferred that the polypropylene composition (C) has a flexural modulus measured on injection moulded specimens according to ISO 178 in the range of 1000 to 3000 MPa, more preferably in the range of 1200 to 2800 MPa, still more preferably in the range of 1500 to 2700 MPa.

Additionally or alternatively to the previous paragraph, the polypropylene composition (C) has a flexural modulus measured on foamed specimens according to ISO 178 in the range of 800 to 2000 MPa, more preferably in the range of 900 to 1800 MPa, still more preferably in the range of 1000 to 1500 MPa.

Preferably, the polypropylene composition (C) according to the present invention is obtained by a process comprising the steps of a) preparing the heterophasic propylene copolymer (HECO) comprising the propylene polymer (PP1) and the elastomeric copolymer (EPR) in a sequential process comprising at least two reactors, and b) blending the heterophasic propylene copolymer (HECO) with the polymeric fibers (PF), optionally the propylene polymer (PP2) and optionally the additives (AD).

The process for preparing the heterophasic propylene copolymer (HECO) is described in more detail below.

In the following, the heterophasic propylene copolymer (HECO), the polymeric fibers (PF) and the propylene polymer (PP2) are described in more detail.

The Heterophasic Propylene Copolymer (HECO)

The heterophasic propylene copolymer (HECO) preferably comprises a propylene polymer (PP1) as a matrix in which an elastomeric propylene copolymer (EPR) is dispersed. Accordingly the elastomeric propylene copolymer (EPR) is (finely) dispersed in the propylene polymer (PP1). In other words the propylene (PP1) constitutes a matrix in which the elastomeric propylene copolymer (EPR) forms inclusions in the matrix, i.e. in the propylene polymer (PP1). Thus the matrix contains (finely) dispersed inclusions being not part of the matrix and said inclusions contain the elastomeric propylene copolymer (EPR). The term "inclusion" according to this invention shall preferably indicate that the matrix and the inclusion form different phases within the heterophasic propylene copolymer (HECO). Said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Preferably, the heterophasic propylene copolymer (HECO) has a melt flow rate $MFR_2$ (230° C., 2.16 kg) determined according to ISO 1133 in the range of 0.1 to 30.0 g/10 min, more preferably in the range of 1.0 to 20.0 g/10 min, still more preferably in the range of 5.0 to 17.0 g/10 min, like 8.0 to 12.0 g/10 min.

As mentioned above, the heterophasic propylene copolymer (HECO) according to this invention preferably comprises (a) a propylene polymer (PP1) as the matrix and
(b) an elastomeric propylene copolymer (EPR).

Preferably the weight ratio between the propylene polymer (PP1) and the elastomeric propylene copolymer (EPR) [PP1/EPR] of the heterophasic propylene copolymer (HECO) is in the range of 80/20 to 40/60, more preferably in the range of 75/35 to 45/55, yet more preferably in the range of 70/30 to 50/50, like in the range of 70/30 to 60/40.

Preferably, the heterophasic propylene copolymer (HECO) has an ethylene content of equal or below 30.0 mol %, more preferably in the range of 10.0 to 30.0 mol %, still more preferably in the range of 12.0 to 25.0 mol %, like in the range of 15.0 to 21.0 mol %.

Preferably the heterophasic propylene copolymer (HECO) has a xylene cold soluble (XCS) fraction (25° C.) in the range of 25.0 to 40.0 wt %, more preferably in the range of 26.0 to 39.0 wt %, still more preferably in the range of 27.0 to 38.0 wt %, like in the range of 28.0 to 35.0 wt %.

Preferably the comonomer content, more preferably the ethylene content of the xylene cold soluble fraction (XCS) of the heterophasic propylene copolymer (HECO) is in the range of 40.0 to 55.0 mol %, more preferably in the range of 42.0 to 54.0 mol %, still more preferably in the range of 45.0 to 52.0 mol %, like in the range of 46.0 to 50.0 mol %.

In a preferred embodiment the intrinsic viscosity (IV) determined according to DIN ISO 1628/1, October 1999 (in Decalin at 135° C.) of the xylene cold soluble fraction (XCS) of the heterophasic propylene copolymer (HECO) is in the range of 2.0 to 3.0 dl/g, more preferably in the range 2.1 to 2.8 dl/g, still more preferably in the range of 2.2 to 2.7 dl/g, like in the range of 2.3 to 2.5 dl/g.

The propylene polymer (PP1) is preferably a random propylene copolymer (R-PP1) or a propylene homopolymer (H-PP1), the latter especially preferred.

In case the propylene polymer (PP1) is a random propylene copolymer (R-PP1) it is appreciated that the random propylene copolymer (R-PP1) comprises monomers co-polymerizable with propylene, for example co-monomers such as ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R-PP1) according to this invention comprises, especially consists of, monomers co-polymerizable with propylene from the group consisting of ethylene, 1-butene and 1-hexene. More specifically the random propylene copolymer (R-PP1) of this invention comprises—apart from propylene—units derivable from ethylene and/or 1-butene. In a preferred embodiment the random propylene copolymer (R-PP1) comprises units derivable from ethylene and propylene only.

Additionally it is appreciated that the random propylene copolymer (R-PP1) has preferably a comonomer content in the range of more than 0.3 to 1.5 mol %, more preferably in the range of more than 0.35 to 1.2 mol %, yet more preferably in the range of 0.4 to 1.0 mol %.

As indicated above, however, it is preferred that the propylene polymer (PP1) is a propylene homopolymer (H-PP1).

Further it is appreciated that the propylene polymer (PP1), like the propylene homopolymer (H-PP1), has a melt flow rate $MFR_2$ (230° C.) measured according to ISO 1133 of 20.0 to 100.0 g/10 min, more preferably of 30.0 to 80.0 g/10 min, still more preferably of 40.0 to 70.0 g/10 min, still more preferably of 50.0 to 60.0 g/10 min.

Further it is preferred that the propylene polymer (PP1) according to this invention has a xylene soluble fraction (XCS) of not more than 10.0 wt %, in case of a propylene homopolymer (H-PP1) the xylene soluble fraction (XCS) is even lower, i.e. not more than 6.0 wt %.

Accordingly it is preferred that the propylene homopolymer (H-PP1) has a xylene soluble fraction (XCS) of below 5.0 wt %, more preferably in the range of 0.5 to 4.5 wt %, like in the range of 1.0 to 3.5 wt %.

The second component of the heterophasic propylene copolymer (HECO) is the elastomeric propylene copolymer (EPR).

The elastomeric propylene copolymer (EPR) comprises, preferably consists of, units derivable from (i) propylene and (ii) ethylene.

The ethylene content of the elastomeric propylene copolymer (EPR) of the heterophasic propylene copolymer (HECO) is in the range of 30.0 to 60.0 mol %, more preferably in the range of 35.0 to 58.0 mol %, still more preferably in the range of 40.0 to 55.0 mol %, yet more preferably in the range of 45.0 to 55.0 mol %, like in the range of 40.0 to 49.0 mol %.

Further, the heterophasic propylene copolymer (HECO) may comprise a nucleating agent (NU). Preferably, said nucleating agent (NU) is an α-nucleating agent. Accordingly, it is preferred that the heterophasic propylene copolymer (HECO) is free of β-nucleating agents. The α-nucleating agent (NU) is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis (4,6,-di-tert-butylphenyl) phosphate or aluminum-hydroxy-bis[2,2'-methylene-bis(4,6-di-t-butylphenyl)phosphate], and (iv) vinylcycloalkane polymer and vinylalkane polymer (as discussed in more detail below), and (v) mixtures thereof.

Such additives are generally commercially available and are described, for example, in "Plastic Additives Handbook", pages 871 to 873, 5th edition, 2001 of Hans Zweifel.

Preferably the heterophasic propylene copolymer (HECO), contains up to 5.0 wt % of the α-nucleating agent (NU). In a preferred embodiment, the heterophasic propylene copolymer (HECO) contains not more than 500 ppm, more preferably of 0.025 to 200 ppm, more preferably of 0.1 to 200 ppm, still more preferably 0.3 to 200 ppm, most preferably 0.3 to 100 ppm of the α-nucleating agent (NU), in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, sodium 2,2'-methylenebis (4,6,-di-tert-butylphenyl) phosphate, vinylcycloalkane polymer, vinylalkane polymer, and mixtures thereof.

It is particularly preferred that the α-nucleating agent (NU) is a polymeric α-nucleating agent.

Accordingly, it is preferred that the first α-nucleating agent (NU) is a vinylcycloalkane polymer and/or a vinylalkane polymer. It is especially preferred that the first α-nucleating agent (NU) is a vinylcycloalkane polymer as described in more detail below.

The heterophasic propylene copolymer (HECO) can be produced by blending the propylene polymer (PP1) and the elastomeric propylene copolymer (EPR). However, it is preferred that the heterophasic propylene copolymer (HECO) is produced in a sequential step process, using reactors in serial configuration and operating at different reaction conditions. As a consequence, each fraction prepared in a specific reactor may have its own molecular weight distribution and/or comonomer content distribution.

Accordingly, the heterophasic propylene copolymer (HECO) can be obtained by a sequential polymerization process wherein the propylene polymer (PP1) is produced in a first reactor (R1) and optionally in a second reactor (R2), and wherein the elastomeric propylene copolymer (EPR) is produced in one or more subsequent reactors to obtain the heterophasic propylene copolymer (HECO). For a continuous multi-reactor polymerization setup, the reactors are separated by space, e.g. the first reactor (R1) and the second reactor (R2) are separate standalone vessels, in which the propylene polymer (PP1), produced in the first reactor (R1), is being continuously supplied to the second reactor (R2). For a bench-scale laboratory batch single reactor polymerization setup the reactors are separated by time, e.g. the first reactor (R1) and the second reactor (R2) are the same vessel, in which the propylene polymer (PP1) is produced first according to the first reactor (R1) specific conditions for a certain time (e.g. bulk polymerization), and then the resulting material is subjected to the second reactor (R2) specific conditions for a certain time (e.g. gas phase polymerization) staying physically in the same single polymerization reactor.

In one embodiment, the heterophasic propylene copolymer (HECO) is obtained by a sequential polymerization process wherein the propylene polymer (PP1) is produced in a first reactor (R1) and wherein the elastomeric propylene copolymer (EPR) is produced in a second reactor (R2) to obtain the heterophasic propylene copolymer (HECO).

In one embodiment, the heterophasic propylene copolymer (HECO) is obtained by a sequential polymerization process wherein the propylene polymer (PP1) is produced in a first reactor (R1) and a second reactor (R2) and wherein the elastomeric propylene copolymer (EPR) is produced in a third reactor (R3) to obtain the heterophasic propylene copolymer (HECO).

In one embodiment, the heterophasic propylene copolymer (HECO) is obtained by a sequential polymerization process wherein the propylene polymer (PP1) is produced in a first reactor (R1) and a second reactor (R2) and wherein the elastomeric propylene copolymer (EPR) is produced in a third reactor (R3) and a fourth rector (R4) to obtain the heterophasic propylene copolymer (HECO).

Accordingly, the present process comprises at least a first reactor (R1) and a second reactor (R2). For example, the process may comprise at least a first reactor (R1), a second reactor (R2), optionally a third reactor (R3) and optionally a fourth reactor (R4), preferably a first reactor (R1), a second reactor (R2), a third reactor (R3) and a fourth reactor (R4).

The term "sequential polymerization process" indicates that the heterophasic propylene copolymer is produced in at least two reactors, preferably in three reactors or more, connected in series. The term "polymerization reactor" shall indicate that the main polymerization takes place. Thus, in case the process consists of two, three or four polymerization reactors, this definition does not exclude the option that the overall process comprises for instance a prepolymerization step in a prepolymerization reactor. The term "consist of" is only a closing formulation in view of the main polymerization reactors.

It is appreciated that after a first reactor (R1) and an optional second reactor (R2) the propylene polymer (PP1) being the matrix of the heterophasic propylene copolymer (HECO), is obtained. The propylene polymer (PP1) is subsequently transferred into at least one further reactor, in which the elastomeric propylene copolymer (EPR) is produced and the heterophasic propylene copolymer (HECO) is obtained.

The first reactor (R1) is preferably a slurry reactor (SR) and can be any continuous or simple stirred batch tank reactor or loop reactor (LR) operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2), the optional third reactor (R3) and the optional fourth reactor (R4) are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus, in a preferred embodiment the first reactor (R1) is a slurry reactor (SR), like loop reactor (LR), whereas the second reactor (R2), the optional third reactor (R3) and the optional fourth reactor (R4) are gas phase reactors (GPR). Accordingly, for the instant process at least two, preferably three or four polymerization reactors, namely a slurry reactor (SR), like loop reactor (LR), a first gas phase reactor (GPR1), an optional second gas phase reactor (GPR2) and an optional a third gas phase reactor (GPR3) connected in series are used. If needed prior to the slurry reactor (SR) a prepolymerization reactor is placed.

In one embodiment the first reactor (R1) is a slurry reactors (SR) and the second reactor (R2), the optional third reactor (R3) and the optional fourth reactor (R4) are gas phase reactors.

In a preferred embodiment the heterophasic propylene copolymer (HECO) is obtained from a process comprising a first reactor (R1), a second reactor (R2), a third reactor (R3) and a fourth reactor (R4), wherein the polypropylene matrix (PP1) is prepared in the first reactor (R1), being a loop reactor (LR) and the second reactor (R2), being a first gas phase reactor (GPR1), and wherein the elastomeric propylene copolymer rubber (EPR) is prepared in the third reactor (R3), being a second gas phase reactor (GPR2) and the fourth reactor, being a third gas phase reactor (GPR3).

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably the conditions for the slurry reactor (SR), like a loop reactor (LR), may be as follows:
the temperature is within the range of 40° C. to 110° C., preferably between 60° C. and 100° C., like 68 to 95° C.,
the pressure is within the range of 2 bar to 80 bar, preferably between 30 bar to 60 bar,
hydrogen can be added for controlling the molar mass in a manner known per se, either continuously or batch-wise, depending on the process type employed.

Preferably the conditions for the gas phase reactors (GPR-1), (GPR-2) and (GPR-3) respectively may be as follows:
the temperature is within the range of 50° C. to 130° C., preferably between 60° C. and 100° C.,
the pressure is within the range of 5 bar to 50 bar, preferably between 12 bar to 35 bar,
hydrogen can be added for controlling the molar mass in a manner known per se, either continuously or batch-wise, depending on the process type employed.

The residence time can vary in the different reactors. It is appreciated that the residence time in the slurry reactor (SR), like a loop reactor (LR), is in the range of 0.2 to 4 hours, e.g. 0.3 to 1.5 hours and the residence time in the gas phase reactors (GPR1), (GPR2) and (GPR3) respectively is in the range of 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR1), (GPR2) and (GPR3).

The process may also comprise a prepolymerization with the catalyst system used. In a preferred embodiment, the prepolymerization is conducted as bulk slurry polymerization in liquid propylene, i.e. the liquid phase mainly comprises propylene, with minor amount of other reactants and optionally inert components dissolved therein. The prepolymerization reaction is typically conducted at a temperature of 0 to 50° C., preferably from 10 to 45° C., and more preferably from 15 to 40° C. The pressure in the continuous prepolymerization reactor must be higher than that in the subsequent slurry reactor (SR), like the loop reactor (LR) to prevent backflow from the slurry reactor (SR) back to the prepolymerization reactor, typically 1 bar higher. Thus, the pressure in the prepolymerization reactor may be from 10 to 100 bar, for example 31 to 70 bar. For a bench-scale batch polymerization system, the pressure is not critical but must be sufficiently high to maintain the reaction mixture in liquid phase (10-25 bar depending on temperature).

The precise control of the prepolymerization conditions and reaction parameters is within the skill of the art.

According to the invention, the heterophasic propylene copolymer (HECO) is obtained by a sequential polymerization process, as described above, in the presence of a catalyst system. It is appreciated that there are no specific restrictions regarding the catalyst system as long as a Ziegler-Natta catalyst is used. As regards catalyst systems suitable for preparing the heterophasic propylene copolymer (HECO), reference is made to e.g. WO 2014/023603, EP 591 224, WO 2012/007430, EP 2 610 271, EP 261 027 and EP 2 610 272, which are incorporated herein by reference.

For example, the heterophasic propylene copolymer (HECO) is obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention for preparing the heterophasic propylene copolymer (HECO) is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

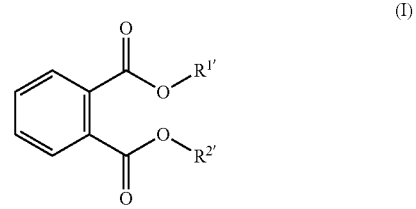

(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor
c) washing the product of stage b) or
d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2 \cdot nROH$, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2 \cdot nROH$, wherein R is methyl or ethyl, preferably ethyl and n is 1 to 6, is contacting with $TiCl_4$ to form a titanized carrier, followed by the steps of adding to said titanised carrier
(i) a dialkylphthalate of formula (I) with $R^{1'}$ and $R^{2'}$ being independently at least a $C_5$-alkyl, like at least a $C_8$-alkyl, or preferably
(ii) a dialkylphthalate of formula (I) with $R^{1'}$ and $R^{2'}$ being the same and being at least a $C_5$-alkyl, like at least a $C_8$-alkyl, or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate, to form a first product, subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol %, more preferably 90 mol %, most preferably 95 mol %, of a dialkylphthalate of formula (II)

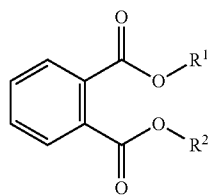

with $R^1$ and $R^2$ being methyl or ethyl, preferably ethyl, the diallylphthalate of formula (II) being the internal donor and recovering said transesterification product as the procatalyst composition (component (i)).

The thus obtained Ziegler-Natta procatalyst can be modified by polymerising a vinyl compound in the presence of the catalyst system, comprising the special Ziegler-Natta procatalyst (component (i)), an external donor (component (iii)) and optionally a cocatalyst (component (iii)), which vinyl compound has the formula:

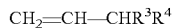

$CH_2=CH-CHR^3R^4$ wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic propylene copolymer (HECO) according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

The Polymeric Fibers (PF)

The propylene composition (C) according to the present invention further comprises polymeric fibers (PF)

The term "polymeric fibers (PF)" as used herein refers to a fiber that is not a glass fiber or carbon fiber. That is to say, the polymer-based fiber (PF) differs from glass fibers or carbon fibers. Furthermore, the term "polymeric fibers (PF)" within the meaning of the present application refers to a fiber that is not a polypropylene, like polypropylene fiber.

Preferably, the polymeric fibers (PF) have a melting temperature $T_m$ equal or above 210° C. Preferably, the polymer-based fibers (PF) have a melting temperature $T_m$ in the range of 210 to 350° C., more preferably in the range of 210 to 300° C.

According to one embodiment of the present invention, the polymeric fibers (PF) have an average fiber length of from 0.1 to 20 mm and most preferably of 0.5 to 20 mm.

Additionally or alternatively, the polymeric fibers (PF) have an average diameter of from 5 to 30 μm, preferably from 5 to 28 μm.

In one embodiment, the polymeric fibers (PF) have a tenacity in the range of 3.0 to 17 cN/dtex, more preferably in the range of 3.0 to 13.0 cN/dtex, still more preferably in the range of 4.0 to 11.0 cN/dtex, like in the range of 5.0 to 9.0 cN/dtex.

Additionally or alternatively, the polymeric fibers (PF) preferably have a Young Modulus determined according to ISO 5079 in the range of 3.0 to 35.0 N/tex, more preferably in the range of 3.0 to 17.0 N/tex, still more preferably in the range of 5.0 to 15.0 N/tex, like in the range of 6.0 to 12.0 N/tex.

For example, the polymeric fibers (PF) are selected from poly vinyl alcohol (PVA) fibers, polyethylene terephthalate (PET) fibers, polyamide (PA) fibers and mixtures thereof. Preferably, the polymeric fibers (PF) are polyethylene terephthalate (PET) fibers or poly vinyl alcohol (PVA) fibers. Most preferably, the polymeric fibers (PF) are a polyethylene terephthalate (PET) fibers.

PVA fibers are well known in the art and are preferably produced by a wet spinning process or a dry spinning process.

PVA itself is synthesized from acetylene [74-86-2] or ethylene [74-85-1] by reaction with
acetic acid (and oxygen in the case of ethylene), in the presence of a catalyst such as zinc acetate, to form vinyl acetate [108-05-4] which is then polymerized in methanol. The polymer obtained is subjected to methanolysis with sodium hydroxide, whereby PVA precipitates from the methanol solution.

PVA used for the manufacture of fibers generally has a degree of polymerization of not less than 1,000, preferably not less than 1,200 and more preferably not less than 1,500. Most preferably the PVA has a degree of polymerization of around 1,700, e.g. 1,500 up to 2,000. The degree of hydrolysis of the vinyl acetate is generally at least 99 mol %.

The mechanical properties of PVA fibers vary depending on the conditions of fiber manufacture such as spinning process, drawing process, and acetalization conditions, and the manufacture conditions of raw material PVA.

The PVA fibers can be in the form of (multi)filaments or staple fibers.

PVA fibers are characterized by high strength, low elongation, and high modulus. Suitable PVA fibers preferably have a tenacity of from 3.0 cN/dtex to 17.0 cN/dtex, more preferably from 4.0 cN/dtex to 17.0 cN/dtex, even more preferably from 6.0 cN/dtex to to 14.0 cN/dtex and most preferably from 7.0 cN/dtex to 13.0 cN/dtex.

Furthermore, such PVA fibers preferably have a Young Modulus in the range of 3.0 to 35.0 N/tex, preferably in the range of 10.0 to 30.0 N/tex and more preferably in the range of 15.0 to 25.0 N/tex (ISO 5079).

PVA fibers being suitable for the present invention have an an average fiber length of from 0.1 to 20 mm and most preferably of 0.5 to 20 mm.

The fiber average diameter of suitable PVA fibers is in the range of 5 to 30 μm, preferably in the range of 5 to 28 μm, more preferably in the range of 5 to 26 μm, even more preferably in the range of 5 to 24 μm and most preferably in the range of 5 to 22 μm.

In one embodiment, the PVA fibers have a density in the range of 1,100 to 1,400 kg/m$^3$, preferably in the range of 1,200 to 1,400 kg/m$^3$.

PVA fibers being suitable for the present invention are furthermore surface treated with a so-called sizing agent. This can be done with known methods, like for example immersing the fibers in a tank in which a sizing agent is placed, being nipped and then drying in a hot-air oven, or with a hot roller or a hot plate.

Example of sizing agents include polyolefin resin, polyurethane resin, polyester resin, acrylic resin, epoxy resin, starch, vegetable oil, modified polyolefin. The amount of the sizing agent related to the polyvinyl alcohol fibers is within the common knowledge of a skilled person and can be, for example in the range of from 0.1 to 10 parts by weight of the sizing agent with respect to 100 parts by weight of the polyvinyl alcohol fiber.

A surface treating agent may be incorporated in the sizing agent to improve the wettability or adhesiveness between the polyvinyl alcohol fibers and the polypropylene composition.

Examples of the surface treating agent include silane coupling agents, titanate coupling agents, aluminum coupling agents, chromium coupling agents, zirconium coupling agents, borane coupling agents, and preferred are silane coupling agents or titanate coupling agents, and more preferably silane coupling agents.

The PET fibers can be in the form of (multi)filaments or staple fibers.

PET fibers are characterized by high strength, low elongation, and high modulus. Suitable PET fibers preferably have a tenacity of from 3.0 cN/dtex to 17.0 cN/dtex, more preferably from 3.0 cN/dtex to 13.0 cN/dtex, even more preferably from 4.0 cN/dtex to 11.0 cN/dtex and most preferably from 5.0 cN/dtex to 9.0 cN/dtex.

Furthermore, such PET fibers preferably have a Young Modulus in the range of 3.0 to 35 N/tex, preferably in the range from 3.0 to 17 N/tex, more preferably in the range of 5.0 to 15 N/tex and most preferably in the range of 6 to 12 N/tex (ISO 5079).

PET fibers being suitable for the present invention have an average fiber length of from 0.1 to 20 mm and most preferably of 0.5 to 20 mm.

The fiber average diameter of suitable PET fibers is in the range of 5 to 30 μm, preferably in the range of 5 to 28 μm, and most preferably in the range of 5 to 26 μm, even more preferably in the range of 5 to 24 μm and most preferably in the range of 5 to 22 μm.

In one embodiment, the PET fibers have a density in the range of 1,100 to 1,400 kg/m$^3$, preferably in the range of 1,200 to 1,400 kg/m$^3$.

The Propylene Polymer (PP2)

The polypropylene composition (C) may further comprise a propylene polymer (PP2) having a higher melt flow rate MFR$_2$ (230° C., 2.16 kg) determined according to ISO 1133 than the propylene polymer (PP1) being the matrix of the heterophasic propylene copolymer (HECO).

Accordingly, the propylene polymer (PP2) is preferably a high flow propylene polymer. Thus, it is preferred that the propylene polymer (PP2) has a melt flow rate MFR2 (230° C., 2.16 kg) determined according to ISO 1133 of at least 100 g/10 min, more preferably in the range of 100 to 800 g/10 min, still more preferably in the range of 200 to 500 g/10 min, yet more preferably in the range of 300 to 490 g/10 min, like in the range of 400 to 480 g/10 min.

In this regard, it is preferred that the propylene polymer (PP2) is visbroken. Unless otherwise indicated, throughout the instant invention the melt flow rate MFR$_2$ (230° C./2.16 kg) of the propylene polymer (PP2), is preferably the melt flow rate (230° C./2.16 kg) after visbreaking.

Accordingly, the melt flow rate MFR$_2$ (initial) (230° C./2.16 kg), i.e. the melt flow rate before visbreaking, of the propylene polymer (PP2) is much lower, like from 15 to 150 g/10 min. For example, the melt flow rate MFR$_2$ (initial) (230° C./2.16 kg) of the propylene polymer (PP2) before visbreaking is from 30 to 140 g/10 min, like from 50 to 120 g/10 min.

In one embodiment of the present invention, the propylene polymer (PP2) has been visbroken with a visbreaking ratio [final MFR$_2$ (230° C./2.16 kg)/initial MFR$_2$ (230° C./2.16 kg)] at least 5, wherein "final MFR$_2$ (230° C./2.16 kg)" is the MFR$_2$ (230° C./2.16 kg) of the propylene polymer (PP2) after visbreaking and "initial MFR$_2$ (230° C./2.16 kg)" is the MFR$_2$ (230° C./2.16 kg) of the propylene polymer (PP2) before visbreaking. Preferably, the propylene polymer (PP2) has been visbroken with a visbreaking ratio [final MFR$_2$ (230° C./2.16 kg)/initial MFR$_2$ (230° C./2.16 kg)] of 5 to 25, wherein "final MFR$_2$ (230° C./2.16 kg)" is the MFR$_2$ (230° C./2.16 kg) of the propylene homopolymer after visbreaking and "initial MFR$_2$ (230° C./2.16 kg)" is the MFR$_2$ (230° C./2.16 kg) of the propylene homopolymer before visbreaking. More preferably, the propylene polymer (PP2) has been visbroken with a visbreaking ratio [final MFR$_2$ (230° C./2.16 kg)/initial MFR$_2$ (230° C./2.16 kg)] of 5 to 15, wherein "final MFR$_2$ (230° C./2.16 kg)" is the MFR$_2$ (230° C./2.16 kg) of the propylene polymer (PP2) after visbreaking and "initial MFR$_2$ (230° C./2.16 kg)" is the MFR$_2$ (230° C./2.16 kg) of the propylene polymer (PP2) before visbreaking.

As mentioned above, one characteristic of propylene polymer (PP2) is that the propylene polymer (PP2) has been visbroken. Preferred mixing devices suited for visbreaking are discontinuous and continuous kneaders, twin screw extruders and single screw extruders with special mixing sections and co-kneaders.

By visbreaking the propylene polymer (PP2) with heat or at more controlled conditions with peroxides, the molar mass distribution (MWD) becomes narrower because the long molecular chains are more easily broken up or scissored and the molar mass M, will decrease, corresponding to an MFR$_2$ increase. The MFR$_2$ increases with increase in the amount of peroxide which is used.

Such visbreaking may be carried out in any known manner, like by using a peroxide visbreaking agent. Typical visbreaking agents are 2,5-dimethyl-2,5-bis(tert.butyl-peroxy)hexane (DHBP) (for instance sold under the tradenames Luperox 101 and Trigonox 101), 2,5-dimethyl-2,5-bis(tert-.butyl-peroxy)hexyne-3 (DYBP) (for instance sold under the tradenames Luperox 130 and Trigonox 145), dicumyl-peroxide (DCUP) (for instance sold under the tradenames Luperox DC and Perkadox BC), di-tert.butyl-peroxide (DTBP) (for instance sold under the tradenames Trigonox B and Luperox Di), tert.butyl-cumyl-peroxide (BCUP) (for instance sold under the tradenames Trigonox T and Luperox 801) and bis (tert.butylperoxy-isopropyl)benzene (DIPP) (for instance sold under the tradenames Perkadox 14S and Luperox DC). Suitable amounts of peroxide to be employed in accordance with the present invention are in principle known to the skilled person and can easily be calculated on the basis of the amount of propylene polymer (PP2) to be subjected to visbreaking, the $MFR_2$ (230° C./2.16 kg) value of the propylene polymer (PP2) to be subjected to visbreaking and the desired target $MFR_2$ (230° C./2.16 kg) of the product to be obtained. Accordingly, typical amounts of peroxide visbreaking agent are from 0.005 to 0.7 wt %, more preferably from 0.01 to 0.4 wt %, based on the total amount of propylene polymer (PP2) employed.

Typically, visbreaking in accordance with the present invention is carried out in an extruder, so that under the suitable conditions, an increase of melt flow rate is obtained. During visbreaking, higher molar mass chains of the starting product are broken statistically more frequently than lower molar mass molecules, resulting as indicated above in an overall decrease of the average molecular weight and an increase in melt flow rate.

The propylene polymer (PP2) is preferably obtained by visbreaking the propylene polymer (PP2) preferably visbreaking by the use of peroxide.

A further characteristic of the propylene polymer (PP2) is the low amount of misinsertions of propylene within the polymer chain, which indicates that the propylene polymer (PP2) is produced in the presence of a Ziegler-Natta catalyst. Accordingly, the propylene polymer (PP2) is preferably featured by low amount of 2,1 erythro regio-defects, i.e. of equal or below 0.4 mol %, more preferably of equal or below than 0.2 mol %, like of not more than 0.1 mol %, determined by $^{13}$C-NMR spectroscopy. In an especially preferred embodiment no 2,1 erythro regio-defects are detectable.

It is preferred that the propylene polymer (PP2) is featured by rather low cold xylene soluble (XCS) content, i.e. by a xylene cold soluble (XCS) below 4.1 wt % Accordingly, the propylene polymer (PP2) has preferably a xylene cold soluble content (XCS) in the range of 1.0 to 4.0 wt %, more preferably in the range of 2.0 to 3.8 wt %, still more preferably in the range of 2.2 to 3.5 wt %.

The amount of xylene cold solubles (XCS) additionally indicates that the propylene polymer (PP2) is preferably free of any elastomeric polymer component, like an ethylene propylene rubber. In other words, the propylene polymer (PP2) shall be not a heterophasic polypropylene, i.e. a system consisting of a polypropylene matrix in which an elastomeric phase is dispersed. Such systems are featured by a rather high xylene cold soluble content.

The amount of xylene cold solubles (XCS) additionally indicates that the propylene polymer (PP2) preferably does not contain elastomeric (co)polymers forming inclusions as a second phase for improving mechanical properties. A polymer containing elastomeric (co)polymers as insertions of a second phase would by contrast be called heterophasic and is preferably not part of the present invention. The presence of second phases or the so called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Accordingly, it is preferred that the propylene polymer (PP2) according to this invention has no glass transition temperature below −30° C., preferably below −25° C., more preferably below −20° C.

On the other hand, in one preferred embodiment the propylene polymer (PP2) according to this invention has a glass transition temperature in the range of −12 to 6° C., more preferably in the range of −10 to 4° C.

Further, the propylene polymer (PP2) is preferably a crystalline propylene homopolymer. The term "crystalline" indicates that the propylene polymer (PP2) has a rather high melting temperature. Accordingly throughout the invention the propylene polymer (PP2) is regarded as crystalline unless otherwise indicated. Therefore, the propylene polymer (PP2) preferably has a melting temperature Tm measured by differential scanning calorimetry (DSC) of at least 158° C., more preferably at least 160° C., still more preferably at least 161° C., like in the range of 161° C. to 165° C.

Further it is preferred that the propylene polymer (PP2) has a crystallization temperature $T_c$ measured by differential scanning calorimetry (DSC) of equal or more than 110° C., more preferably in the range of 110 to 128° C., more preferably in the range of 114 to 120° C.

Preferably, the propylene polymer (PP2) is obtained by polymerizing propylene in the presence of a Ziegler-Natta catalyst. It is preferred that the propylene polymer (PP2) is a propylene polymer known in the art. A non-limiting example for a suitable propylene polymer (PP2) is the commercial propylene homopolymer HL504FB of Borealis.

The Additives (AD)

In addition to the heterophasic propylene copolymer (HECO) comprising the propylene polymer (PP1) and the elastomeric propylene copolymer (EPR), the polymeric fibers (PF) and the propylene polymer (PP2), the polypropylene composition (C) of the invention may include additives (AD). Typical additives are acid scavengers, antioxidants, colorants, light stabilisers, plasticizers, slip agents, anti-scratch agents, dispersing agents, processing aids, lubricants, pigments, and the like.

Such additives are commercially available and for example described in "Plastic Additives Handbook", 6$^{th}$ edition 2009 of Hans Zweifel (pages 1141 to 1190).

Furthermore, the term "additives (AD)" according to the present invention also includes carrier materials, in particular polymeric carrier materials.

The Polymeric Carrier Material

Preferably the fiber reinforced polypropylene composition (C) of the invention does not comprise (a) further polymer(s) different to the the heterophasic propylene copolymer (HECO) comprising the propylene polymer (PP1) and the elastomeric propylene copolymer (EPR), the polymeric fibers (PF) and the propylene polymer (PP2) in an amount exceeding 15 wt %, preferably in an amount exceeding 10 wt %, more preferably in an amount exceeding 9 wt %, based on the weight of the fiber reinforced polypropylene composition (C). Any polymer being a carrier material for additives (AD) is not calculated to the amount of polymeric compounds as indicated in the present invention, but to the amount of the respective additive.

The polymeric carrier material of the additives (AD) is a carrier polymer to ensure a uniform distribution in the fiber reinforced polypropylene composition (C) of the invention. The polymeric carrier material is not limited to a particular polymer. The polymeric carrier material may be ethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer. It is preferred that the polymeric carrier material does not contain monomeric units derivable from styrene or derivatives thereof.

The Article

The present invention also relates to a foamed article, like a foamed automotive article, comprising the polypropylene composition (C) as defined above. The present invention in particular relates to a foamed article, like a foamed automotive article, comprising at least 60 wt %, more preferably at least 80 wt %, still more preferably at least 90 wt %, like at least 95 wt % or at least 99 wt %, of the polypropylene composition (C) as defined above. In an especially preferred embodiment the present invention relates to a foamed article, like a foamed automotive article, consisting of the polypropylene composition (C) as defined above. In an especially preferred embodiment the present invention relates to a foamed article, like a foamed automotive article, made from the polypropylene composition (C) as defined above by foaming it.

The Use

The present invention is also directed to the use of the inventive composition for the production of a foamed article as described in the previous paragraphs.

Further, the present invention is directed to polymeric fibers (PF) as an impact modifier for a heterophasic propylene copolymer (HECO). Preferably, the polymeric fibers (PF) correspond to the polymeric fibers (PF) described above.

The present invention will now be described in further detail by the examples provided below.

EXAMPLES

1. Measuring Methods $MFR_2$ (230° C.) is measured according to ISO 1133 (230° C., 2.16 kg load).

Quantification of Microstructure by NMR Spectroscopy

Quantitative $^{13}C\{^1H\}$ NMR spectra were recorded in the solution-state using a Bruker Avance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium (III) acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225, Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra. Quantitative $^{13}C\{^1H\}$ NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed (Cheng, H. N., Macromolecules 17 (1984), 1950) and the comonomer fraction calculated as the fraction of ethylene in the polymer with respect to all monomer in the polymer: fE=(E/(P+E) The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents. The mole percent comonomer incorporation was calculated from the mole fraction: E [mol %]=100*fE. The weight percent comonomer incorporation was calculated from the mole fraction: E [wt %]=100*(fE*28.06)/((fE*28.06)+((1−fE)*42.08))

The glass transition temperature Tg is determined by dynamic mechanical analysis according to ISO 6721-7. The measurements are done in torsion mode on compression moulded samples (40×10×1 mm$^3$) between −100° C. and +150° C. with a heating rate of 2° C./min and a frequency of 1 Hz.

Intrinsic viscosity is measured according to DIN ISO 1628/1, October 1999 (in Decalin at 135° C.).

The xylene solubles (XCS, wt.-%): Content of xylene cold solubles (XCS) is determined at 25° C. according ISO 16152; first edition; 2005 Jul. 1. The part which remains insoluble is the xylene cold insoluble (XCI) fraction.

DSC analysis, melting temperature ($T_m$) and crystallization temperature ($T_c$): measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. The crystallization temperature ($T_c$) is determined from the cooling step, while melting temperature ($T_m$) and melting enthalpy ($H_m$) are determined from the second heating step. The crystallinity is calculated from the melting enthalpy by assuming an Hm-value of 209 J/g for a fully crystalline polypropylene (see Brandrup, J., Immergut, E. H., Eds. Polymer Handbook, 3rd ed. Wiley, New York, 1989; Chapter 3).

Flexural Modulus: The flexural modulus was determined in 3-point-bending according to ISO 178 on injection molded specimens of 80×10×4 mm and on foamed injection-moulded plaques 80×10× the final thickness prepared out of the foamed plaque which has a dimension of 200× 400× final thickness in mm.

Puncture energy is determined in the instrumented falling weight test according to ISO 6603-2 on foamed parts with dimensions of 148×100 mm manufactured out of a foamed plate with dimensions of 200×400 mm and a thickness of 3 mm. The instrumented falling weight test was performed at a test speed of 10 mm/s with a clamped, lubricated striker of 20 mm diameter.

Maximum force at break was determined on plaques with dimensions 100×100×2 mm during instrumented falling weight impact testing according to ISO 6603-2. The test was performed at room temperature with a lubricated tip with a diameter of 20 mm and impact velocity of 10 mm/s. The maximum force at break was determined as the maximum peak at the force-deformation curve collected during the test.

Compression test was performed on compacted injection-moulded plaques with dimensions of 200×400×2 mm and foamed injection-moulded plaques with dimensions of 200×400×3 mm at room temperature according to ISO 527-2. The tests were carried out on a Zwick Z010U machine with a test speed adapted to the thickness of the plaques. The test speed was 0.81 mm/min for 2 mm thickness and 1.22 mm/min for 3 mm thickness. The test was carried out at room temperature. The apparent modulus was determined by calculating the biggest slope of the stress strain curve until a deformation of 5% occurs.

Average fiber diameter, average fiber length and aspect ratio: Pellets obtained from pultrusion were embedded in Struers CaldoFix resin under vacuum. For determining the average fiber diameter, the polished cross sections of these pellets were determined. Abrasion/polishing was performed on a Struers LaboPol-5 machine, employing grinding media with particle sizes down to 0.04 μm. The samples thus prepared were analyzed using an Olympus optical microscope in brightfield mode. The dimensions of the fiber cross-sections of the fibers in the matrix were measured to get the average fiber-diameter (typically around 30 individual fibers were measured and the shortest dimension of the fiber cross-section was used to get the fiber diameter).

In contrast, the average fiber length was determined by X-ray computed tomography (XCT). For the generation of XCT data a sub-μm CT nanotom (GE phoenix x-ray nanotom 180NF, Wunstorf, Germany) was used. The tube was operated at 70 kV to obtain enough contrast. The voxel size was (2 m)$^3$, the measured volume was (5×2×3 mm)$^3$ of a sample of injection moulded specimen as described in EN ISO 1873-2 (dog bone shape, 4 mm thickness). The XCT data were processed by various algorithmic steps to ascertain the three-dimensional structure of the sample. The fibre length distribution was derived from the XCT data and the weighted mean average of the fibre length distribution was taken as the average fibre length. The aspect ratio can be calculated from the average fiber diameter and length.

2. Examples

Preparation of the Catalyst

First, 0.1 mol of MgCl$_2$×3 EtOH was suspended under inert conditions in 250 ml of heptane in a reactor at atmospheric pressure. The solution was cooled to the temperature of −15° C. and 300 ml of cold TiCl$_4$ was added while maintaining the temperature at said level. Then, the temperature of the slurry was increased slowly to 20° C. At this temperature, 0.02 mol of di(2-ethylhexyl)phthalate was added to the slurry. After the addition of the phthalate, the temperature was raised to 135° C. during 90 minutes and the slurry mixing was continued for 60 minutes at this temperature. Then, another 300 ml of filtered TiCl$_4$ was added and the temperature was kept at 135° C. for 120 minutes. After this, the catalyst was filtered from the liquid and washed six times with 300 ml heptane at 80° C. Then, the solid catalyst component was filtered and dried.

Catalyst and its preparation concept is described in general e.g. in patent publications EP 491 566, EP 591 224 and EP 586 390.

The catalyst was further modified (VCH modification of the catalyst).

35 ml of mineral oil (Paraffinum Liquidum PL68) was added to a 125 ml stainless steel reactor followed by 0.82 g of triethyl aluminium (TEAL) and 0.33 g of dicyclopentyl dimethoxy silane (donor D) under inert conditions at room temperature. After 10 minutes 5.0 g of the catalyst prepared above (Ti content 1.4 wt %) was added and after additionally 20 minutes 5.0 g of vinylcyclohexane (VCH) was added. The temperature was increased to 60° C. during 30 minutes and was kept there for 20 hours. Finally, the temperature was decreased to 20° C. and the concentration of unreacted VCH in the oil/catalyst mixture was analysed and was found to be 200 ppm weight.

Preparation of the Heterophasic Polypropylene Composition (HECO) and the Polypropylene Composition (C)

The heterophasic polypropylene compositions (HECO) were prepared in a sequential process comprising a loop (bulk) reactor and three gas phase reactors. The reaction conditions are summarized in Table 1.

Composites were prepared using the components in the amounts as indicated in Table 2 below. The following inventive example IE1 as well as comparative example CE1 were prepared by impregnating the endless PET fibers in a pultrusion process. The impregnating was carried out at a temperature not exceeding 210° C. Comparative examples CE2 and CE3 were prepared by melt blending the components set out in Table 2 on a co-rotating twin screw extruder. The polymer melt mixture was discharged and pelletized.

Subsequently, compacted injection-moulded plaques of the composites according to examples CE1 and CE2 with dimensions of 200×400×2 mm and foamed injection-moulded plaques of examples IE1 and CE3 with dimensions of 200×400×3 mm were produced with a one-point gating system. The plaques were injection-moulded with a filling time of 0.5 s.

As can be gathered from Table 2, the application of PET-fibers instead of talc clearly improves the performance of the foamed part (IE1 vs. CE3). Especially the multiaxial performance of the foamed parts containing PET-fibers is outstanding compared to the talc filled material, but also the compressive stiffness is improved significantly.

TABLE 1

Preparation of the heterophasic propylene copolymer (HECO)

|  |  | HECO |
|---|---|---|
| Prepolymerization |  |  |
| Residence time | [h] | 0.08 |
| Temperature | [° C.] | 30 |
| TEAL/Ti | [mol/mol] | 220 |
| TEAL/Do | [mol/mol] | 7.3 |
| Loop (R1) |  |  |
| Temperature | [° C.] | 72 |
| H2/C3 ratio | [mol/kmol] | 15 |
| C2/C3 ratio | [mol/kmol] | 0 |
| MFR$_2$ | [g/10 min] | 55 |
| XCS | [wt %] | 2.0 |
| C2 content | [mol %] | 0 |
| Split | [wt %] | 25 |
| 1$^{st}$ GPR (R2) |  |  |
| Temperature |  | 80 |
| Pressure | [kPa] | 2231 |
| H2/C3 ratio | [mol/kmol] | 150 |
| C2/C3 ratio | [mol/kmol] | 0 |
| MFR$_2$ | [g/10 min] | 55 |
| XCS | [wt %] | 2.0 |
| C2 content | [mol %] | 0 |
| Split | [wt %] | 40 |
| 2$^{nd}$ GPR (R3) |  |  |
| Temperature | [° C.] | 70 |
| Pressure | [kPa] | 2291 |
| C2/C3 ratio | [mol/kmol] | 584 |
| H2/C2 ratio | [mol/kmol] | 117 |

TABLE 1-continued

Preparation of the heterophasic propylene copolymer (HECO)

| | | HECO |
|---|---|---|
| MFR$_2$ | [g/10 min] | 20 |
| XCS | [wt %] | 20 |
| C2 content | [mol %] | 18 |
| split | [wt %] | 20 |
| 3$^{rd}$ GPR (R4) | | |
| Temperature | | 85 |
| Pressure | [kPa] | 1421 |
| C2/C3 ratio | [mol/kmol] | 585 |
| H2/C2 ratio | [mol/kmol] | 93 |
| MFR$_2$ | [g/10 min] | 11 |
| XCS | [wt %] | 30 |
| C2 content | [mol %] | 19 |
| IV(XCS) | [dl/g] | 3.5 |
| C2(XCS) | [mol-%] | 50 |
| split | [wt %] | 15 |

TABLE 2

Composition and properties of the comparative and inventive examples

| | | CE1[1] | CE2[1] | CE3[2] | IE1[2] |
|---|---|---|---|---|---|
| HECO | /wt % | 72.73 | 80.0 | 80.0 | 72.73 |
| PET | /wt % | 20.0 | | | 20.0 |
| PP2 | /wt % | 7.23 | | | 7.23 |
| Talc | /wt % | | 20.0 | 20.0 | |
| Flexural test | | | | | |
| Flexural Modulus | /MPa | 1673 | 2027 | 1296 | 1041 |
| IPT test | | | | | |
| Energy to max force | /J | 14.5 | 10.0 | 6.8 | 7.3 |
| Max force | /N | 1816.4 | 1126.3 | 821.1 | 1075.7 |
| Puncture energy | /J | 16.1 | 16.2 | 10.5 | 11.3 |
| Compression test | | | | | |
| Apparent modulus | /MPa | 699 | 685 | 129 | 251 |
| Specimen length | /mm | 2.0 | 1.9 | 2.7 | 2.8 |

[1] Compact parts
[2] Foamed parts

PET is the commercial endless PET multifilament yarn on bobbins PES 11000 f2000 Type 715, tenacity of 7.45 cN/dtex, elongation at break 13%, with a specific surface-treatment for PP, supplied by Durafiber Technologies, Germany.

PP2 is the commercial propylene homopolymer HL504FB of Borealis having a melt flow rate of 450 g/10 min.

Talc is the commercial Talc Jetfine 3CA of Luzenac.

The invention claimed is:

1. A polypropylene composition (C), comprising
   a) 68.0 to 77.0 wt % of a heterophasic propylene copolymer (HECO) having a melt flow rate MFR$_2$ (230° C., 2.16 kg) determined according to ISO 1133 in the range of 0.1 to 30 g/10 min and having a xylene soluble fraction (XCS) in the range of 28.0 to 35.0 wt %, based on the overall weight of the heterophasic propylene copolymer (HECO) comprising
      i) a matrix being a propylene polymer (PP1), and
      ii) an elastomeric propylene copolymer (EPR) being dispersed in said matrix, wherein the elastomeric propylene copolymer (EPR) has an ethylene content of 40.0 to 55.0 mol %,
   b) 6.5 to 8.5 wt % of a crystalline propylene homopolymer (PP2) having a melt flow rate MFR$_2$ (230° C., 2.16 kg) determined according to ISO 1133 in the range of 100 to 800 g/10 min, and
   c) 15.0 to 25.0 wt % of polymeric fibers (PF), wherein the polymeric fibers (PF) are polyethylene terephthalate fibers (PET-F) having a melting temperature Tm equal or above 210° C.,
   based on the overall weight of the polypropylene composition (C),
   wherein said polypropylene composition (C) is a foamable polypropylene composition.

2. The polypropylene composition (C) according to claim 1, wherein the propylene polymer (PP1) is a propylene homopolymer (H-PP1).

3. The polypropylene composition (C) according to claim 1, wherein the xylene soluble fraction (XCS) of the heterophasic propylene copolymer (HECO) has
   i) a comonomer content in the range of 40.0 to 55.0 mol %, and
   ii) an intrinsic viscosity IV determined according to DIN ISO 1628/1, October 1999 (in Decalin at 135° C.) in the range of 2.0 to 3.0 dl/g.

4. The polypropylene composition (C) according to claim 1, wherein the polymeric fibers (PF) have
   i) an average fiber length in the range of 0.1 to 20.0 mm, and
   ii) an average fiber diameter in the range of 5.0 to 30.0 µm, and
   iii) a density in the range of 1100 to 1400 kg/m$^3$.

5. The polypropylene composition (C) according to claim 1, wherein the polymeric fibers (PF) have
   i) a tenacity in the range of 3.0 to 17 cN/dtex, and
   ii) a Young Modulus determined according to ISO 5079 in the range of 3.0 to 35.0 N/tex.

6. The polypropylene composition (C) according to claim 1, wherein said polypropylene composition (C) is free of glass fibers and carbon fibers.

7. The polypropylene composition (C) according to claim 1, wherein the polymeric fibers (PF) are configured as an impact modifier for the heterophasic propylene copolymer (HECO).

8. A process comprising producing a foamed article comprising the polypropylene composition (C) according to claim 1.

9. A foamed article comprising the polypropylene composition (C) according to claim 1.

10. The foamed article according to claim 9, wherein said foamed article comprises at least 90 wt.-% of the polypropylene composition (C).

* * * * *